(12) United States Patent
Johnson

(10) Patent No.: US 7,103,944 B2
(45) Date of Patent: Sep. 12, 2006

(54) LID STRAP DEVICE

(76) Inventor: Gary M. Johnson, 247 Revere La. N., Champlin, MN (US) 55316

( * ) Notice: Subject to any disclaimer, the term of this patent is extended or adjusted under 35 U.S.C. 154(b) by 0 days.

(21) Appl. No.: 10/878,471

(22) Filed: Jun. 28, 2004

(65) Prior Publication Data

US 2005/0097710 A1    May 12, 2005

Related U.S. Application Data

(63) Continuation-in-part of application No. 10/702,331, filed on Nov. 6, 2003, now abandoned.

(51) Int. Cl.
*B65D 45/02* (2006.01)
(52) U.S. Cl. .............. 24/300; 220/315; 220/318; 24/301; 222/108
(58) Field of Classification Search .......... 24/265 H, 24/265 AL, 300, 301, 302, 122.3, 68 CD; 220/315, 318, 323, 912; 292/288, 258; 222/108
See application file for complete search history.

(56) References Cited

U.S. PATENT DOCUMENTS

| | | | | |
|---|---|---|---|---|
| 3,291,515 A | * | 12/1966 | Lierman | 292/288 |
| 4,545,501 A | * | 10/1985 | DeFord | 220/318 |
| 4,860,408 A | * | 8/1989 | Johnson | 24/68 CD |
| 5,313,669 A | * | 5/1994 | Rasdell et al. | 2/323 |
| 6,202,263 B1 | * | 3/2001 | Harker | 24/300 |
| 6,601,726 B1 | * | 8/2003 | Bianco et al. | 220/315 |
| 6,675,977 B1 | * | 1/2004 | Parks | 211/41.9 |

* cited by examiner

*Primary Examiner*—Robert J. Sandy
*Assistant Examiner*—Marcus Menezes
(74) *Attorney, Agent, or Firm*—Robert E. Kleve

(57) ABSTRACT

The invention comprises a decorative lid strap for securing the cover of a casserole to the top of the casserole or container so that the casserole can be transported safely while food and etc. is in the casserole. The lid strap has an elongated elastic strap with hooks mounted to the outer ends of the elastic strap so that the strap may be stretched over the top of the cover of the container and the hooks attached to the opposing handles of the container to secure the cover to the casserole or container. A decorative sleeve is removably mounted over the strap while the strap is mounted over the cover of the casserole.

2 Claims, 4 Drawing Sheets

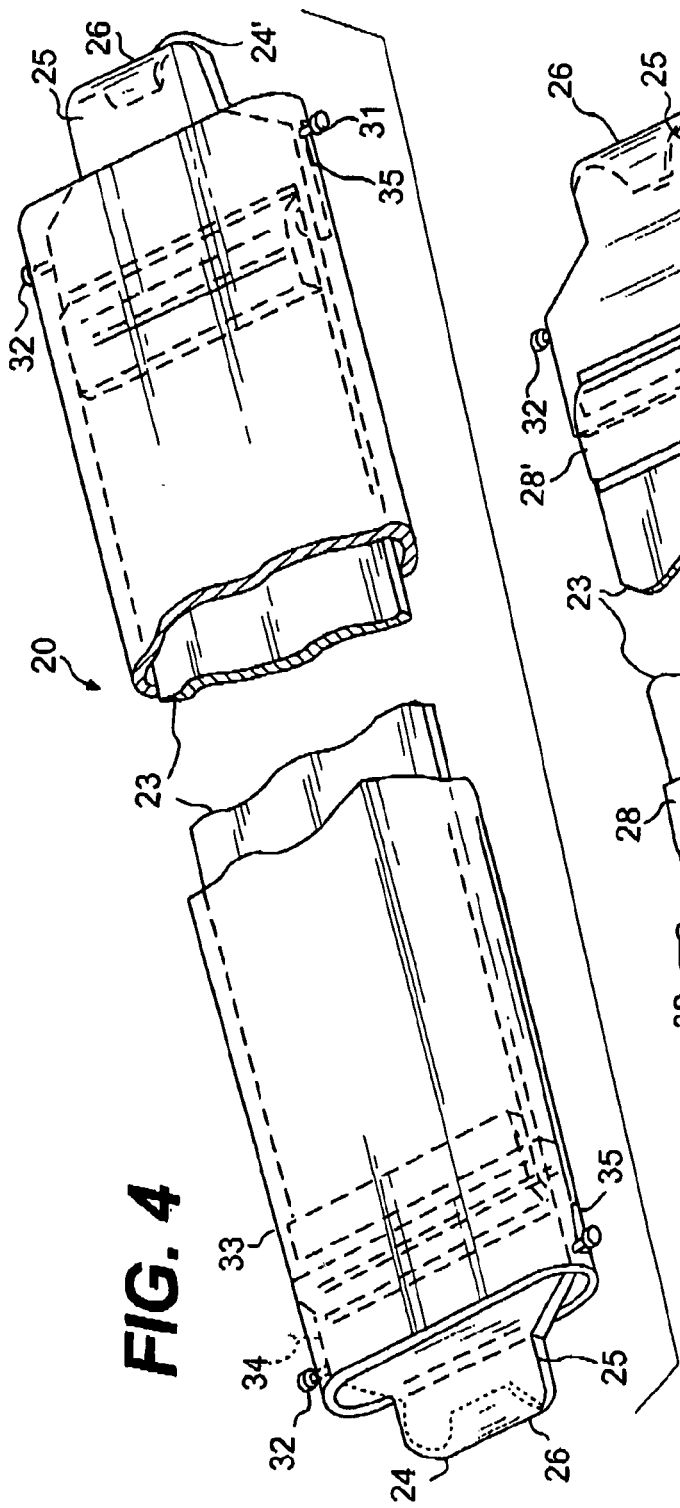
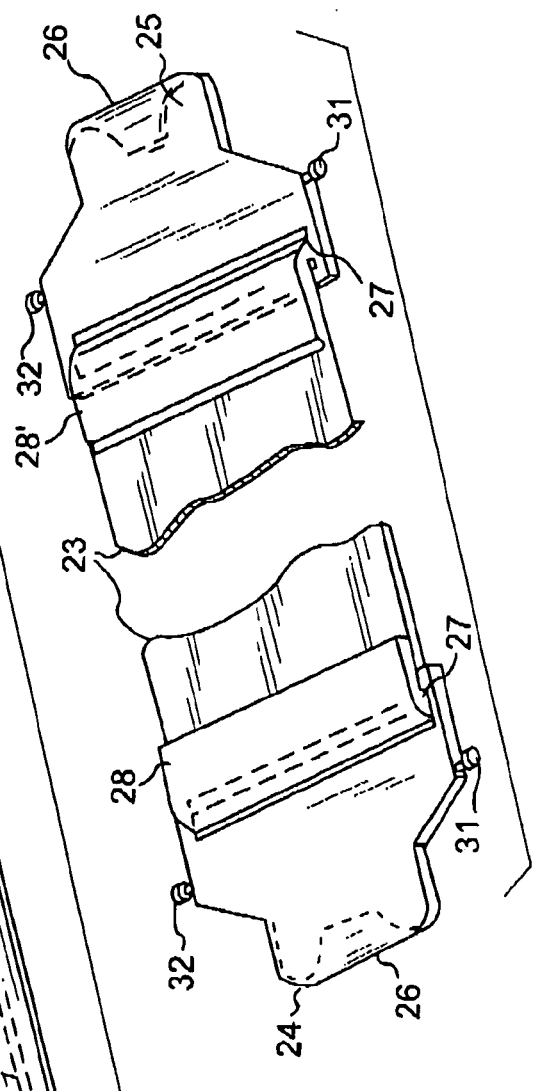

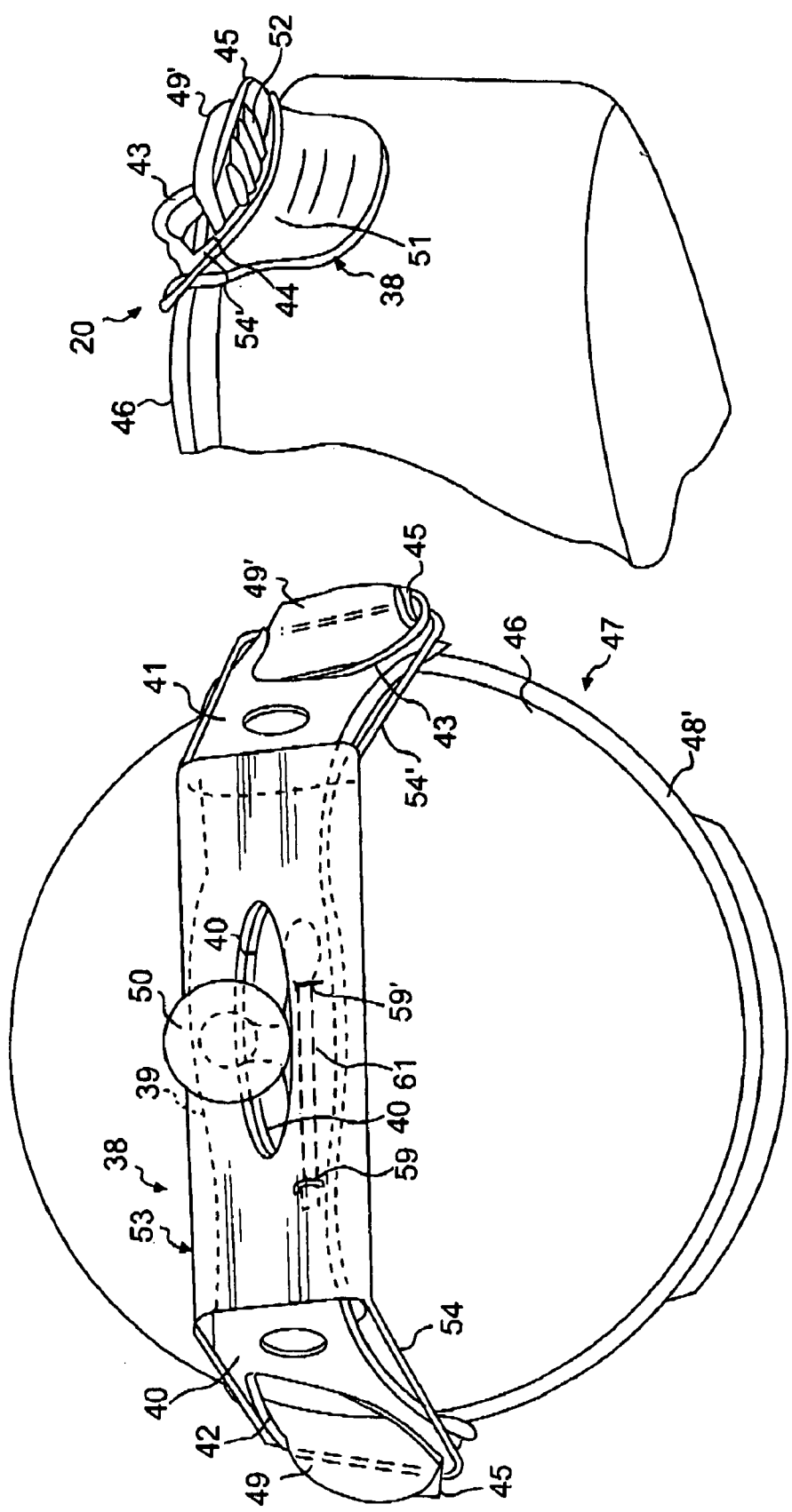

LID STRAP DEVICE

This application is a continuation in part of my earlier patent application Ser. No. 10/702,331, filed Nov. 6, 2003 now abandoned entitled Lid Strap Device This invention relates to holding straps. More particularly, the invention relates to securing straps to secure a lid or cover of a container.

It is an object of the invention to provide a novel lid strap to secure the lid or cover of a container, such as, while it is being transported It is a further object of the invention to provide a novel strap to secure a cover to a bowl to prevent the cover from coming off the bowl, such as the lid of a casserole.

It is a further object of the invention to provide a novel strap to secure a casserole cover to a casserole bowl which has a decorative sleeve removably mounted to the strap.

It is another object of the invention to provide a novel strap to secure a cover to a bowl which has a sleeve which can be removably mounted to the strap with the sleeve having a decorative matter thereon, scenes, written matter, and/ or advertising thereon.

Further objects and advantages of the invention will become apparent as the description proceeds and when taken in conjunction with the accompanying drawings wherein:

BRIEF DESCRIPTION OF THE DRAWINGS

FIG. 4 is a perspective view of the lid strap invention.

FIG. 5 is a perspective view of the lid strap invention with the decorative sleeve removed.

FIG. 6 is a perspective view of a first modified form of lid strap invention having a first modified attachment strap with a first modified form of decorative sleeve like attachment to the to the strap.

FIG. 7 is an enlarged fragmentary view of one of the molded loop ends of the first modified form of strap for the invention.

BRIEF DESCRIPTION OF THE PREFERRED EMBODIMENT

Briefly stated, the invention comprises a lid strap to secure the lid of a container while the container is being transported. The lid strap has an elastic strap with hooks at opposite ends to hook over the handles of the container with the strap extending over the top of the container. The strap hooks each have projecting buttons or pins on its opposing sides edges, and a elongated decorative sleeve is removably mounted over the strap and eyelets are provided in the sleeve at its opposite ends to receive the buttons to secure the sleeve to the strap.

Figure 1:
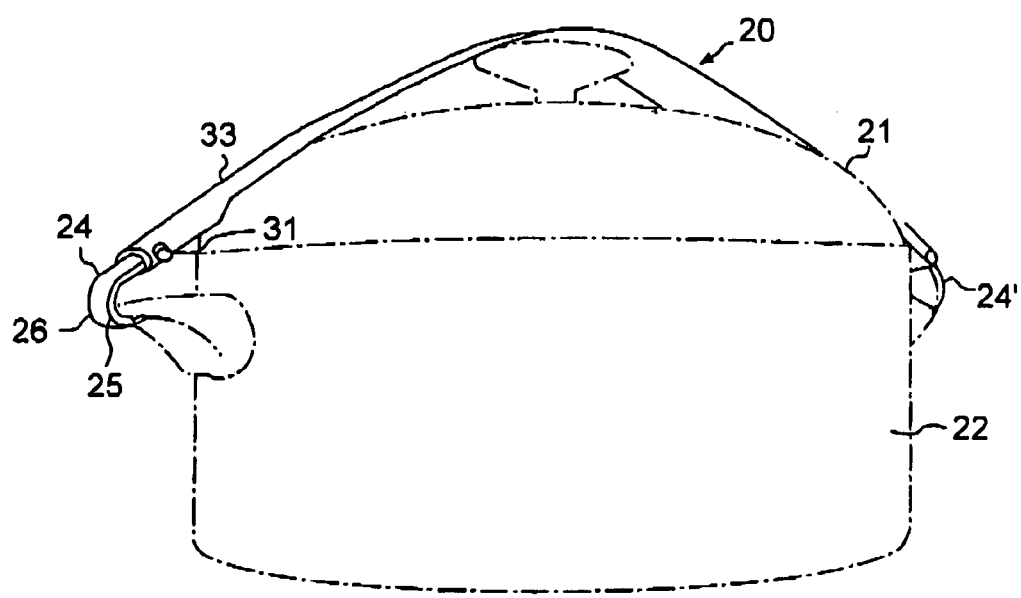
FIG. 1 is a perspective view of the lid strap showing the strap securing a lid of a container

Referring more particularly to the drawings, in FIG. 1 the lid strap invention 20 is illustrated mounted in a position extending over the lid 21 of a container 22 to secure the lid in place on the container while transporting the container while it may contain food of some kind.

A elastic strap 23 of the strap invention 20 is made of an elastic band material and has hook fasteners 24 and 24' at each end. The fasteners 24 and 24' are identical each having a flat plate body portion 25. A hook 26 is formed at one end and a slot 27 is provided at the other end of each fastener. The ends 28 and 28' of the elastic strap 23 are threaded through the slots 27 and folded back against the strap and sewn back to the strap to secure the strap 23 to the fasteners 24 and 24'. On each lateral side edge 29 and 30 of the plate body portion of each fastener 24 and 24' are projecting buttons or pins 31 and 32 which are fixed to the edges 29 and 30, respectively of the fasteners.

Figure 2:
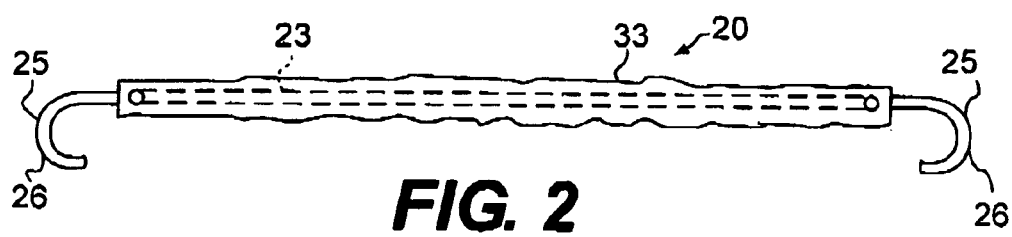
FIG. 2 is a side elevational view of the lid strap invention having a decorative sleeve with the strap un-stretched.
Figure 3:
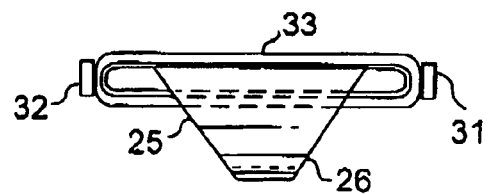
FIG. 3 is a front view of the lid strap invention.

A decorative elongated sleeve 33 is slid over the elongated elastic band or strap 23 as shown in FIGS. 1 and 2. The elongated sleeve 33 has holes or slots 34 and 35 on opposites of the sleeve at each end 36 and 36' of the sleeve. The decorative sleeve 33 is mounted to the strap by being slid over the strap 23, and the sleeve is buttoned onto the fastener buttons of the fasteners by inserting the pins into the slots in the sleeve to secure the sleeve to the strap. The decorative sleeve 33 will remain on the strap while the strap is used to secure a lid to a container such as shown in FIG. 1.

The decorative sleeve 33 may removed from time to time from the strap 23 for washing or cleaning or replaced with an other sleeve having some other decoration or informative material thereon. For example, the sleeve 33 may be make with different seasonal decor such a sleeve with Thanksgiving, Christmas, or New Years decor so that the appropriate sleeve with the appropriate decor may be placed upon the elastic band and use with that band on a casserole of food for meals at the appropriate season The fasteners 24 and will be made of metal or plastic or other material of sufficient strength to maintain their hook like shape, and the strap will have sufficient strength to stretch only to a limited length and not break while mounted over the lid of the container, so as to withstand the weight of the food or other material in the container. Some suitable elastic bands have been found to provide several inches of elasticity to make the operable upon casserole of differing dimensions within limits, and it is intended that the invention be offered in sets of two different size bands to increase its utility.

The strap invention 20 will be attached customarily after the container or casserole 22 has been filled with food and the lid 21 attached to the container by extending and stretching the band over the top of the lid 21 and attaching the hooks at each end of the strap to the handles 36 and 37 of the container 22.

The strap device 20 will be made in different sizes. The elastic strap 23 will be slightly shorter in length when un-stretched than the length of the path of the strap over the lid and onto the handles of the casserole in their secured position over the lid and onto the handles, so as to be under slight elastic tension when attached. However, the strength of the elastic of the band under this tension will be strong enough to enable, customarily, the band to maintain the lid on the container under normal circumstances.

The decorative sleeve, however, will be made slightly longer in length of the strap and the strap will be made in two or more sizes so that the sleeve length when straightened out will more closely conform to the length of the path of the device over the lid when attached. In this manner, when the device is attached over the lid, the sleeve will be stretched out and unbunched so as to be relatively smooth when attached so that the decorative material on the sleeve can be seen more in the manner and design it was intended.

The modification to my lid strap invention which is being added by this continuation in part application is illustrated and set forth in FIGS. 6, 7, and 8, and is described as follows: The first modification of my Lid Strap Device is set forth in FIGS. 6 and 7. The first modified lid strap invention 38 is made of a some resilient, preferably, rubber material and is formed and molded into a single piece lid strap. The first modified rubber lid strap invention 38 has a elongated center strap portion 39 with a slot 40 in the middle of the strap with molded ends 40 and 41 formed integrally with the center strap portion with holes or slots 42 and 43 formed in the molded ends of the strap to provide hook like attachments. The outer edges 44 of the strap defining the holes 42 and 43 each have projecting lip portion 45 adjacent the one edge 44 of each end slots 42 and 43 and are formed integrally with the strap at each edge 44. The first molded lid strap device 38 serves essentially the same function as the lid strap device 20 disclosed in the earlier application identified above.

This function is to secure the lid 46 of a common casserole device 47 wherein the lid rests upon the edge 48' of the vessel or bowl 48 of the casserole so that the casserole may be carried from place to place with the lid securely in place on the bowl. Casseroles of this type commonly have a pair of projecting lips 49 and 49' molded into the opposite edges of the bowl 48 which serve as a handle as earlier described. The lid 46 commonly has a center knob 50 molded on the top of the lid 46. The center slot 40 of the lid strap invention 38 has a construction to serve to receive a center knob 50 of the lid or cover 46 of the casserole 47. The end slots or holes 42 and 43 are formed in the ends of the strap to receive the lips 49 and 49', respectively, bowl 48 as shown in FIGS. 6 and 7 and 4 with the edges of the strap defining the holes 42 and 43 encircling the lips 49 and 49' of the bowl with the elasticity of the strap including the edges of the strap forming the holes 42 and 43 acting to hold the lid and bowl together in a snug manner.

The projecting lip portions 45 of the strap invention 39 is adjacent each of the holes and is molded to rest against the underside 51 of the lips 49 and 49' respectively of the bowl and serves as a gripping surface for gripping the lips of the bowl by the fingers by an operator when grasping the lips of the bowl to carry the casserole a from one location to another. The plastic material of the strap is formed with its surface materials having sufficient frictional action to enable the operator to directly grasp projecting lip portion of the strap when grasping the lips of the bowl with less likelihood of the fingers accidentally slipping off the lips of the of the lid and bowl. The lips 49 and 49' of the strap 38 also have ribs 52 formed into the bottom of the lips to reinforce the projecting shape of the lips.

The first modified form of the invention 38 also has a decorative sleeve 53 which is slidably attached over the strap 39 as illustrated in FIG. 6. The decorative sleeve 53 has elastic loops 54 and 54' attached to each end of the sleeve which may be stretched over the lips 49 and 49' to hold the sleeve in place on the cover or lid 46 of the casserole as well as act to further hold the strap 39 in place. The sleeve is utilized to provide a decorative surface for the casserole when serving food in the casserole.

Figure 8:
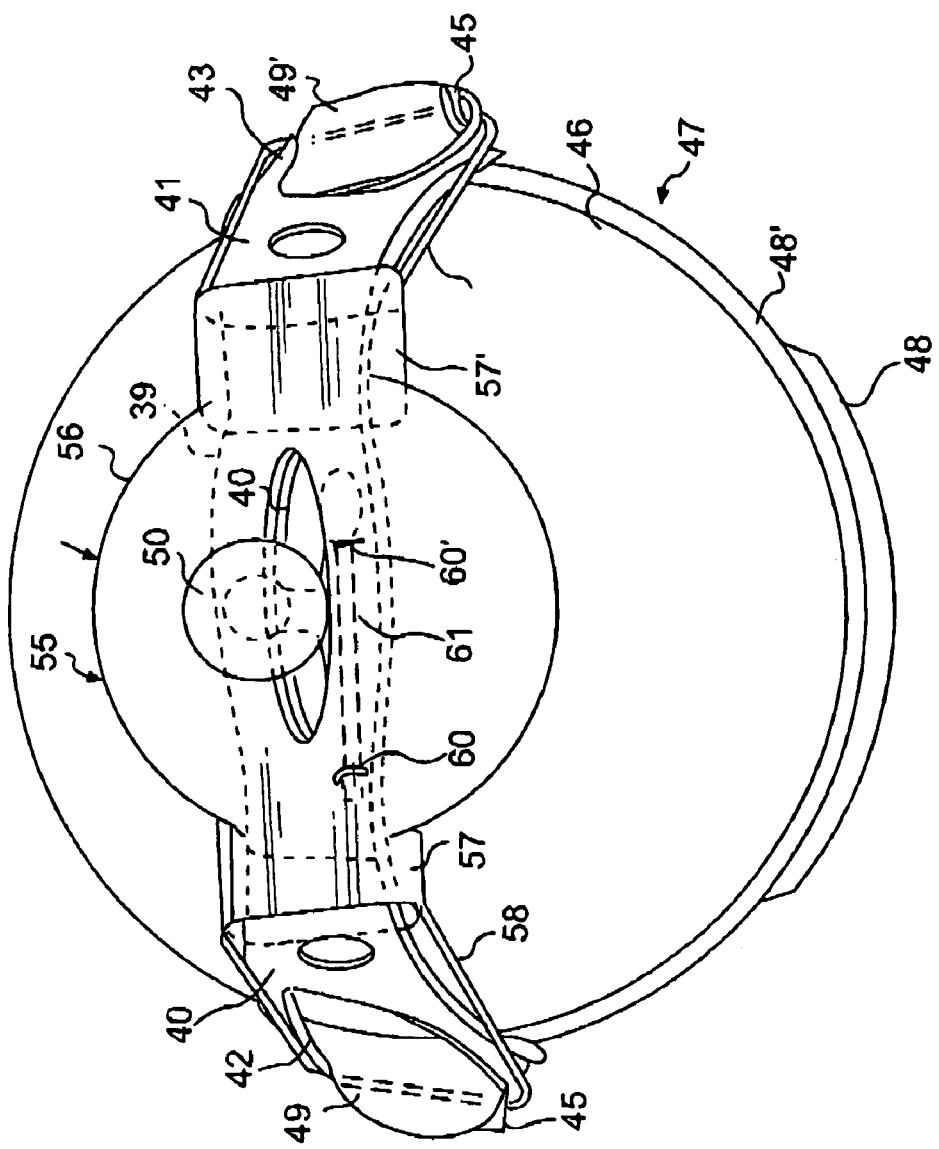
FIG. 8 is a perspective view of the first modified form of strap with a second modified form of decorative attachment to the strap having a flat circular pliable center plate portion serving as a hot pad with sleeve like end portions for attachment to the first modified form of strap.

The second modified form of the invention 55 is illustrated in FIG. 8. The second modified form of the invention has the same mounting strap 39, as in the first modified form set forth in FIGS. 6 and 7. The modification in the second modified form is in the decorative sleeve 55 attached to the mounting strap 39. The second modified decorative sleeve 55 has a center or circular plate member 56 which serves as a decoration and as a hot pad device. The device 55 has end sleeve portions 57 and 57' on each side of the center plate which encircle the mounting strap 39. While the center plate or pad 56 may have decorations thereon and may serve as a decoration surface, although its main purpose is to serve as a hot pad for the casserole. The center or circular plate portion 56 is provided for the operator of the casserole to rest the casserole, upon after placing the casserole upon the table for serving.

Once the operator reaches the table, he may immediately thereafter remove the mounting strap and decoration and place them flat upon the table; and he may then place the casserole upon the circular plate portion 56, which now serves as a hot pad.

The second modification sleeve 55 also has a pair of elastic loops 58 and 58' attached at each end of the sleeve which are looped about the lips 49 and 49' of the bowl to secure the sleeve to the bowl.

The first and second modifications of the decorative sleeve 53 and 55 each have a pair of aligned elastic straps 59 and 59' and 60 and 60', respectively, which are provided to receive the handle of the serving instrument being used to serve the food in the casserole. The end of the handle may be slid into the pair of straps 59 and 59' on the one sleeve 53, or inserted into the straps 60 and 60' of the sleeve 55 to hold the instrument or spoon 61 in place while transporting the casserole to the place of serving.

It will be obvious that various changes and departures may be made to the invention without departing from the spirit and scope thereof; and accordingly, it is not intended that the invention be limited to that specifically described in the specification, or as illustrated in the drawings, but only as set forth in the appended claims wherein:

What is claimed is:

1. A lid strap device for holding a lid onto a container wherein the container has opposing projecting handles, comprising an elongated elastic strap having fastening means formed at each end of the strap, said fastening means each having outer opposing openings encircling the handles of the container, and strap device being adapted to be attached over the top of the cover of the container with the strap stretched under tension over the top of the lid while the lid is attached to the container with the opposed openings of the strap encircling the opposed handles of the container to secure the cover to the container, said strap device having a covering for covering the strap with the strap covering having a circular panel portion which may serve as a hot pad, wherein said strap covering has end sleeves for attachment about the strap and for inserting the strap within the cover.

2. A lid strap device for holding a lid onto a container wherein the container has opposing projecting handles, comprising an elongated elastic strap having fastening means formed at each end of the strap, said fastening means each having outer opposing openings encircling the handles of the container, and strap device being adapted to be attached over the top of the cover of the container with the strap stretched under tension over the top of the lid while the lid is attached to the container with the opposed openings of the strap encircling the opposed handles of the container to secure the cover to the container, said strap device having a covering for covering the strap with the strap covering having a circular panel portion which may serve as a hot pad, said strap having a projecting lip formed at the outer edge of each of the outer opposing openings in the strap for engagement beneath the underside of the handles of the container with said lips each having a sufficient frictional surface to facilitate grasping of the handles by grasping the lips on the underside of the handles, wherein said strap covering has end sleeves for attachment about the strap and for inserting the strap within the cover.

* * * * *